US008826298B2

(12) United States Patent
Arvidsson et al.

(10) Patent No.: US 8,826,298 B2
(45) Date of Patent: Sep. 2, 2014

(54) METHOD AND APPARATUS THAT ENABLES A WEB-BASED CLIENT-SERVER APPLICATION TO BE USED OFFLINE

(75) Inventors: Erik V. Arvidsson, San Francisco, CA (US); Andrew J. Palay, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/556,360

(22) Filed: Jul. 24, 2012

(65) Prior Publication Data
US 2012/0290645 A1 Nov. 15, 2012

Related U.S. Application Data (63) Continuation of application No. 11/809,162, filed on May 30, 2007, now Pat. No. 8,255,921.

(51) Int. Cl.
*G06F 9/46* (2006.01)
*G06F 3/00* (2006.01)
*G06F 9/44* (2006.01)
*G06F 13/00* (2006.01)
*G06F 9/54* (2006.01)

(52) U.S. Cl.
CPC ............... *G06F 9/547* (2013.01); *G06F 9/545* (2013.01); *G06F 9/541* (2013.01)
USPC ............ 719/311; 719/312; 718/100; 718/104

(58) Field of Classification Search
None
See application file for complete search history.

(56) References Cited

U.S. PATENT DOCUMENTS

| 5,991,809 A * | 11/1999 | Kriegsman .................... 709/226 |
| 6,714,987 B1 * | 3/2004 | Amin et al. .................... 709/249 |
| 6,718,390 B1 * | 4/2004 | Still et al. ........................ 709/229 |
| 6,725,401 B1 * | 4/2004 | Lindhorst-Ko .............. 714/47.3 |
| 2001/0016034 A1 | 8/2001 | Singh et al. |
| 2002/0099829 A1 * | 7/2002 | Richards et al. .............. 709/227 |
| 2003/0233404 A1 | 12/2003 | Hopkins |
| 2005/0195810 A1 * | 9/2005 | Sung et al. .................... 370/389 |
| 2005/0197819 A1 | 9/2005 | Hopkins et al. |
| 2007/0113282 A1 * | 5/2007 | Ross ................................ 726/22 |
| 2007/0117584 A1 | 5/2007 | Davis et al. |

(Continued)

OTHER PUBLICATIONS

O'Callahan, Robert et al., "Well, I'm Back: Offline Web Applications", Weblog Mozillazine (online), Feb. 14, 2007, http://webblogs.mozillazine.org/archives/2007/02/offline_web_app.html, downloaded Jan. 23, 2009, 2 pages.

(Continued)

*Primary Examiner* — Emerson Puente
*Assistant Examiner* — Jonathan R Labud
(74) *Attorney, Agent, or Firm* — Harrity & Harrity, LLP (57) ABSTRACT

One embodiment of the present invention provides a system that facilitates using a web-based client-server application offline. During operation, the system receives a function call at an object within a browser that is executing on a client, wherein the function call is generated by the web-based client-server application and is directed to a communication layer on the client. Next, the system determines an intended resource for the function call. The system also determines if the function call should be redirected to an alternate resource. If so, the system redirects the function call to the alternate resource. If not, the system forwards the function call to the intended resource. Note that in some embodiments of the present invention, the entire system operates within the context of the browser.

20 Claims, 4 Drawing Sheets

(56) References Cited

U.S. PATENT DOCUMENTS

| | | |
|---|---|---|
| 2008/0086540 A1 | 4/2008 | Scott et al. |
| 2008/0104195 A1 | 5/2008 | Hawkins et al. |
| 2008/0147671 A1* | 6/2008 | Simon et al. .................. 707/10 |
| 2008/0301221 A1 | 12/2008 | Arvidsson et al. |

OTHER PUBLICATIONS

Kennedy, Niall: "Offline Web Applications", Niall Kennedy's Podcase (online), Apr. 23, 2007, http://www.niallkennedy.com/podcast/2007/04/offline-web-applications.html downloaded Jan. 23, 2009, 2 pages.

Gamma E et al., "Design Patterns: Elements of Reusable Object-Oriented Software", Design Patterns, Elements of Reusable Object-Oriented Software, XX, XX, Jan. 1, 1995, pp. 315-323.

Neuberg, Brad, "The Dojo Offline API", The Sitepen Blog (online), Jan. 23, 2007, http://www.sitepen.com/blog/2007/01/23/the-dojo-offline-api/>, 17 pages.

* cited by examiner

```
/**
 * Calls the callback function with an array of of email addresses returned
 * from the server
 * @param {Function} callback  The function to call with the data
 */
function getAutoCompleteEmailAddresses(callback) {
  var xhr = new XMLHttpRequest();
  xhr.open('GET', getAutoCompleteUri(), true);
  xhr.onload = function() {
    callback(xhr.responseText.split('\n'));
  };
  xhr.send(null);
}
```

FIG. 3A

```
/**
 * Creates a function that will call different servers depending on which
 * server to use.
 * @param {Function} f  The function to create a proxy for.
 * @param {String} type  Something identifying what kind of request this is
 * @return {Function} The new function that should replace the original
 */
function createProxy(f, type) {
  return function() {
    var params = argument;
    if (useServerA) { // original server
      return f.apply(null, params);
    } else if (useServerB) {
      switch (type) {
        case 'autocomplete':
          var callback = params[0];
          callback(['a@domain.com', 'b@domain.com']);
          break;
        ...
      }
    } else if (useServerC) {
      ...
    } ...
  };
}

// replace original function with the proxied function
getAutoCompleteEmailAddresses =
    createProxy(getAutoCompleteEmailAddresses, 'autocomplete');
```

METHOD AND APPARATUS THAT ENABLES A WEB-BASED CLIENT-SERVER APPLICATION TO BE USED OFFLINE

RELATED APPLICATION

This application is a continuation of U.S. patent application Ser. No. 11/809,162, filed on May 30, 2007, the disclosure of which is incorporated by reference herein in its entirety.

BACKGROUND

1. Field of the Invention

The present invention relates to web browsers. More specifically, the present invention relates to a method and an apparatus that enables a web-based client-server application to be used offline.

2. Related Art

Scripting languages and dynamic components are often used in web pages to provide complex functionality to a user. Web servers process many of these scripts and components, and send the resulting output HyperText Markup Language (HTML) code to a browser for display to the user. However, this type of client-server web application requires a connection to the web server to be able to use the client-server web application.

In order to facilitate offline browsing, browsers typically provide a caching mechanism which enables every web page that is delivered to the browser to be stored in a browser cache. At some subsequent time, if the user attempts to view a previously viewed page and the client does not have a connection to the web server that hosted the web page, the browser can retrieve a copy of the web page from the browser cache and can display the copy of the web page to the user.

Modern web applications deliver display logic and data to the browser, such as JavaScript with HTML. Sometime this data has been preformatted for display purpose and sometimes the data is very raw. In either case, the files that are cached are only a snapshot of the data at one point in time, and may be irrelevant to the user at a subsequent time. Moreover, in many instances, the web application prevents this data from being cached.

Consider the example of a browser-based email application. If the browser cache only contains a static representation of the web page from the last time the user visited the browser-based email site, then the web page retrieved from the cache will not be very useful to the user. If the user is only presented with static representations of what was previously viewed, and the server-side logic is not being executed, then the user's actions on the cached pages do not result in the actions intended by the user. Moreover, this can lead to confusion because the user might believe that he or she performed some action that was actually not performed because the server-side logic was not executed.

Hence, what is needed is a method and an apparatus for viewing dynamic web pages in a browser without the problems listed above.

SUMMARY

One embodiment of the present invention provides a system that facilitates using a web-based client-server application offline. During operation, the system receives a function call at an object within a browser that is executing on a client, wherein the function call is generated by the web-based client-server application and is directed to the browser's communication layer. Next, the system determines an intended resource for the function call. The system also determines if the function call should be redirected to an alternate resource within the web-application. If so, the system redirects the function call to the alternate resource. If not, the system forwards the function call to the intended server-based resource.

In some embodiments of the present invention, the alternate resource replicates the actions of the server-based resource. In these embodiments, the alternate resource performs the functions of the server-based resource in a manner which is transparent to the client. While the alternate resource replicates the actions of the server, the alternate resource may or may not execute the same code as the server.

In some embodiments of the present invention, determining if the function call should be redirected to an alternate resource involves determining if the client is working in an offline mode.

In some embodiments of the present invention, determining if the function call should be redirected to an alternate resource involves determining if the intended resource is not reachable.

In some embodiments of the present invention, determining if the function call should be redirected to an alternate resource involves receiving a redirection command from the web-based client-server application.

In some embodiments of the present invention, the intended resource is located on a server and the alternate resource is located on the client.

In some embodiments of the present invention, the web-based client-server application is an Asynchronous JavaScript and XML (AJAX) application.

In some embodiments of the present invention, redirecting the function call involves redirecting the function call in a manner that is not visible to a user.

In some embodiments of the present invention, the object is part of the browser.

In some embodiments of the present invention, the object is a browser extension.

In some embodiments of the present invention, the object is external to the browser, and has hooks into a framework of the browser.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

The data structures and code described in this detailed description are typically stored on a computer-readable storage medium, which may be any device or medium that can store code and/or data for use by a computer system. This includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

Overview

One embodiment of the present invention provides a system that facilitates using a web-based client-server application offline. During operation, the system receives a function call at an object within a browser which is executing on a client, wherein the function call is generated by the web-based client-server application and is directed to the browser's communication layer on the client. Next, the system determines an intended resource for the function call. The system also determines if the function call should be redirected to an alternate resource within the web-application. If so, the system redirects the function call to the alternate resource. If not, the system forwards the function call to the intended server-based resource.

In some embodiments of the present invention, the alternate resource replicates the actions of a server-based resource. In these embodiments, the alternate resource performs the functions of the server-based resource which makes it appear that the client is communicating with the server. While the alternate resource replicates the actions of the server, the alternate resource may or may not execute the same code as the server. In many embodiments, the alternate resource executes different code that performs similar functionality as the server. Note that the alternate resource may include client-side Asynchronous JavaScript and XML (AJAX) to replicate the functionality of the server-side components to present a similar view to a user as if the client was communicating with the server.

In some embodiments of the present invention, determining if the function call should be redirected to an alternate resource involves determining if the client is working in an offline mode.

In some embodiments of the present invention, determining if the function call should be redirected to an alternate resource involves determining if the intended resource is not reachable.

In some embodiments of the present invention, determining if the function call should be redirected to an alternate resource involves receiving a redirection command from the web-based client-server application.

In some embodiments of the present invention, the intended resource is located on a server and the alternate resource is located on the client.

In some embodiments of the present invention, the web-based client-server application is an Asynchronous JavaScript and XML (AJAX) application.

In some embodiments of the present invention, redirecting the function call involves redirecting the function call in a manner that is not visible to a user.

In some embodiments of the present invention, the object is part of the browser.

In some embodiments of the present invention, the object is a browser extension.

In some embodiments of the present invention, the object is external to the browser, and has hooks into a framework of the browser.

Computing Environment

Figure 1:
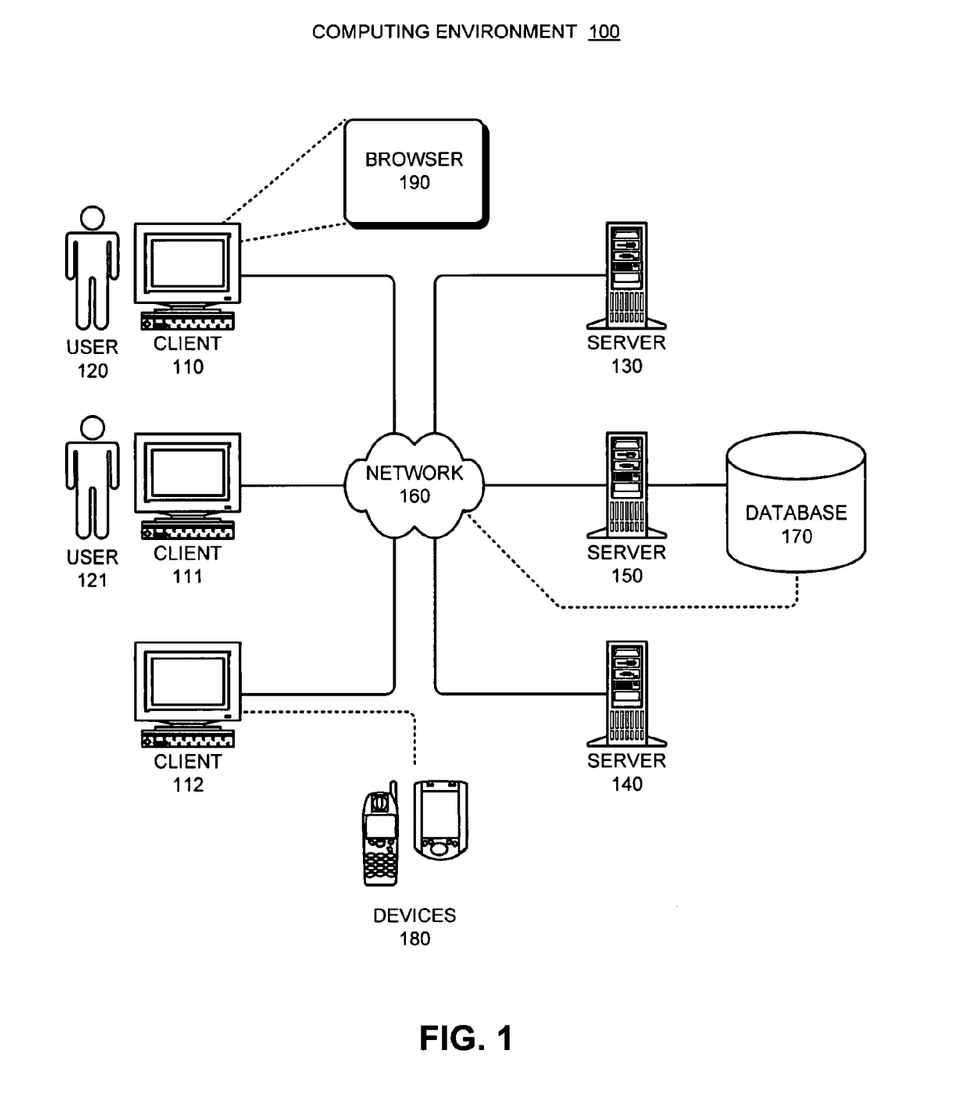
FIG. 1 illustrates a computing environment in accordance with an embodiment of the present invention.

FIG. 1 illustrates a computing environment 100 in accordance with an embodiment of the present invention. Computing environment 100 includes a number of computer systems, which can generally include any type of computer system based on a microprocessor, a mainframe computer, a digital signal processor, a portable computing device, a personal organizer, a device controller, or a computational engine within an appliance. More specifically, referring to FIG. 1, computing environment 100 includes clients 110-112, users 120 and 121, servers 130-150, network 160, database 170, and devices 180.

Clients 110-112 can include any node on a network including computational capability and including a mechanism for communicating across the network.

Similarly, servers 130-150 can generally include any node on a network including a mechanism for servicing requests from a client for computational and/or data storage resources.

Users 120 and 121 can include: an individual; a group of individuals; an organization; a group of organizations; a computing system; a group of computing systems; or any other entity that can interact with computing environment 100.

Network 160 can include any type of wired or wireless communication channel capable of coupling together computing nodes. This includes, but is not limited to, a local area network, a wide area network, or a combination of networks. In one embodiment of the present invention, network 160 includes the Internet. In some embodiments of the present invention, network 160 includes phone and cellular phone networks.

Database 170 can include any type of system for storing data in non-volatile storage. This includes, but is not limited to, systems based upon magnetic, optical, or magneto-optical storage devices, as well as storage devices based on flash memory and/or battery-backed up memory. Note that database 170 can be coupled: to a server (such as server 150), to a client, or directly to a network, such as network 160.

Devices 180 can include any type of electronic device that can be coupled to a client, such as client 112. This includes, but is not limited to, cell phones, Personal Digital Assistants (PDAs), smart-phones, personal music players (such as MP3 players), gaming systems, digital cameras, portable storage media, or any other device that can be coupled to the client. Note that in some embodiments of the present invention, devices 180 can be coupled directly to network 160 and can function in the same manner as clients 110-112.

Browser 190 is installed on client 110. In one embodiment of the present invention, browser 190 can include any program that is capable of displaying web pages that include scripts. Note that browser 190 can be installed on any computational device, such as clients 110-112, servers 130-150, and devices 180.

Browser

Figure 2:
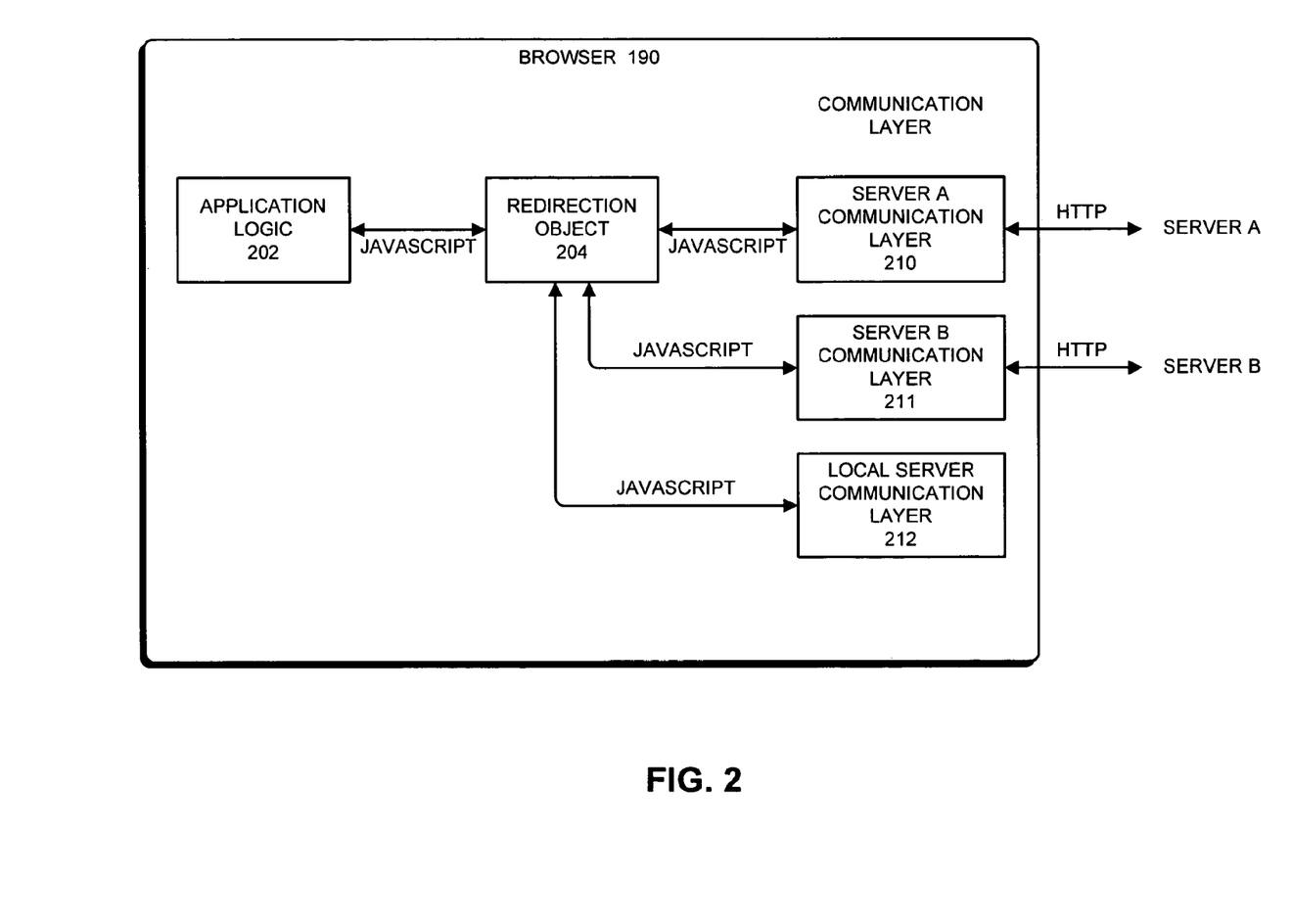
FIG. 2 illustrates a browser in accordance with an embodiment of the present invention.

FIG. 2 illustrates a browser 190 in accordance with an embodiment of the present invention. Browser 190 includes: application logic 202, redirection object 204, server A communication layer 210, server B communication layer 211, and local server communication layer 212. In a traditional web application, application logic 202 is coupled to server communication layer 210, and communicates with server A via server A communication layer 210. However, embodiments of the present invention include a redirection object 204 which may direct function calls: (1) to server A communication layer 210, (2) to the communication layer associated with another remote server (such as server B communication layer 211), or (3) to a different resource (such as local server communication layer 212). Note that browser 190 can execute on any node including computational capability, including clients 110-112, servers 130-150, and devices 180.

In some embodiments of the present invention, application logic 202 communicates with redirection object 204, and redirection object 204 communicates with: server A communication layer 210, server B communication layer 211, and local server communication layer 212 via JavaScript™. While JavaScript™ is shown in these embodiments, in general any method for communicating between these components may be used.

Redirection object 204 intercepts function calls to the communications layer and redirects these calls based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources which are internal and/or external to client 110, such as database 170.

In some embodiments of the present invention, redirection object 204 directs the function calls to local server communication layer 212. Local server communication layer 212 acts as a liaison between browser 190 and a local server executing on the same client 110 as browser 190. Such a redirection may be beneficial in cases where client 110 is disconnected from network 160, and thus has no connection to the intended resource.

Note that the local server executing on client 110 may include code that performs the same functionality as the server code, or alternatively, cached copies of the server code, including any server-side scripting, such as Java Server Pages (JSP) code and Active Server Pages (ASP) code. In this example, the local server processes the server-side code in lieu of the intended server. Furthermore, the end-result is transparent to the user 120. To user 120, it appears no different than if redirection object 204 forwarded the function call to the intended server rather than to the local server.

Exemplary AJAX Function

In one embodiment of the present invention, a programmer identifies the functions and methods that call the server, and then creates proxies for those functions. Note that this is possible in JS because JS is a dynamic language that allows the redefinition of functions and methods at runtime. In this embodiment, the programmer redefines the function so that the function tests which server to use, and then calls the desired server implementation.

Figure 3A:
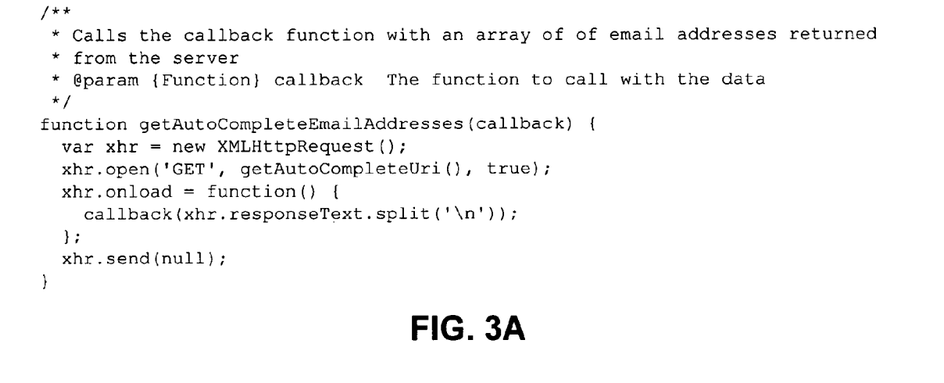
FIG. 3A illustrates an AJAX function in accordance with an embodiment of the present invention.
Figure 3B:
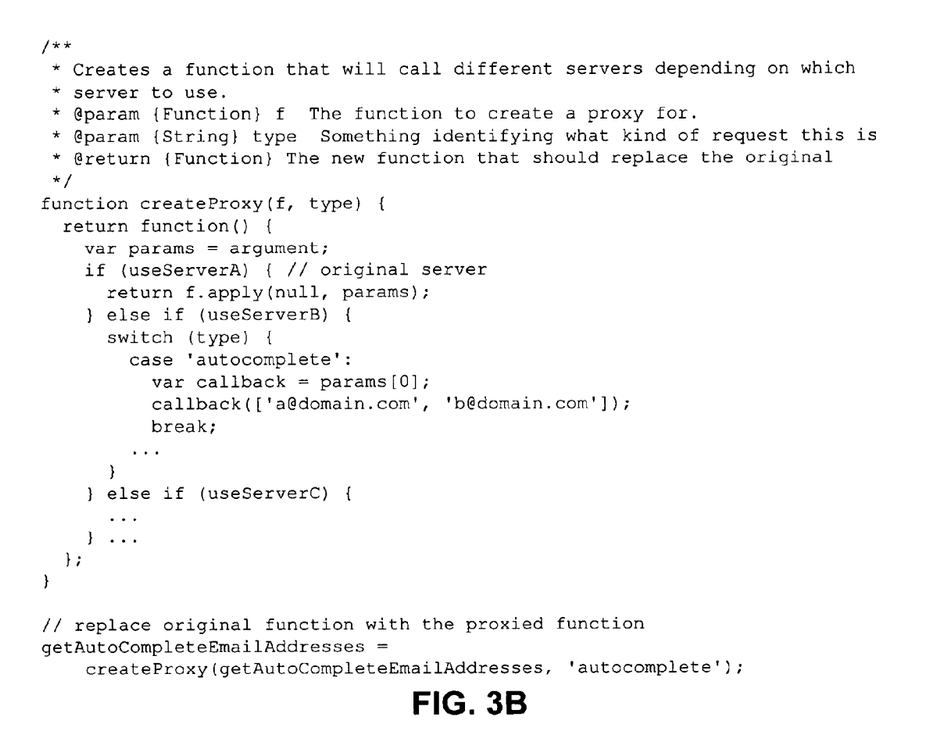
FIG. 3B illustrates a proxy AJAX function in accordance with an embodiment of the present invention.

FIG. 3A illustrates an Asynchronous JavaScript and XML (AJAX) function prior to modification in accordance with an embodiment of the present invention. FIG. 3B illustrates a proxy AJAX function in accordance with an embodiment of the present invention. In the example illustrated in FIG. 3B, a programmer does not have to modify every single function, but instead, can centralize the communication layer to one single entry point. When writing the code for the application, the programmer can simply make each function call via the createProxy ( ) function. Note that for embodiments of the present invention, a proxy function is defined as a function that is invoked in place of an existing function, and then determines whether to invoke the existing function, to invoke an alternate function, or to invoke the existing function with different arguments. This is in contrast to a "proxy" that stores content at the proxy and acts on behalf of existing servers by returning content from the proxy rather than from the servers when requests are made.

Redirecting a Function Call

Figure 4:
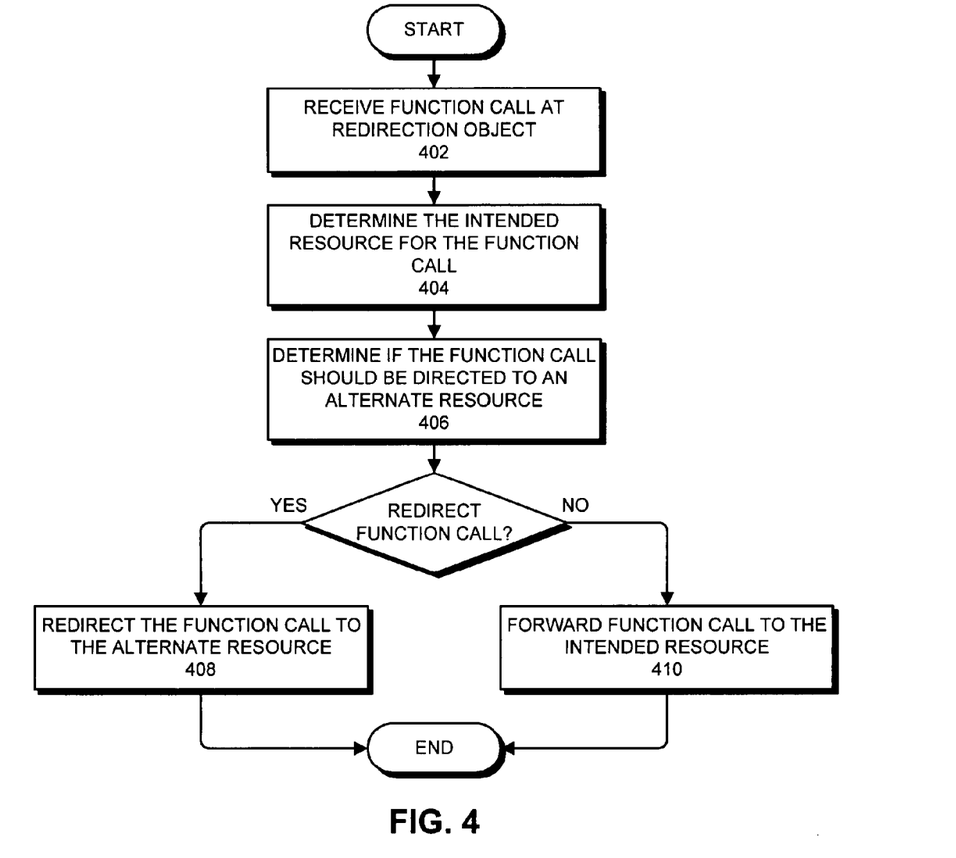
FIG. 4 presents a flow chart illustrating the process of redirecting a function call in accordance with an embodiment of the present invention.

FIG. 4 presents a flow chart illustrating the process of redirecting a function call in accordance with an embodiment of the present invention. During operation, the system receives a function call at redirection object 204 (operation 402) and determines the intended resource for the function call (operation 404). Next, the system determines if the function call should be directed to an alternate resource (operation 406). Note that this redirection decision is based upon predetermined criteria, such as: if the intended destination is unreachable, if the browser 190 is marked as offline, if directed by application logic 202, or any other criteria. Redirection object 204 may redirect function calls to remote servers (servers 130-150), local servers executing on the same client 110, as well as resources internal and/or external to client 110, such as database 170.

If the function call should be directed to an alternate resource, redirection object 204 redirects the function call to the alternate resource (operation 408). However, if not, redirection object 204 forwards the function call to the intended resource (operation 410).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method comprising:
  intercepting a scripting function call at an object within a browser which is executing on a client,
    the client being implemented at least partially in hardware,
    the scripting function call being generated by a web-based client-server application that is executed via the client, and
    the scripting function call being directed to a primary resource that is external to the client,
    the client being connected to the primary resource via a network;
  determining whether to redirect the scripting function call to an alternate resource,
    determining whether to redirect the scripting function call including:
      determining, via a first communication layer of the client, whether the primary resource is reachable via the network;
  redirecting, via a second communication layer of the client, the scripting function call to the alternate resource when the primary resource is unreachable via the network,
    the second communication layer being different than the first communication layer; and
  forwarding, via the first communication layer, the scripting function call to the primary resource when the primary resource is reachable via the network.

2. The method of claim 1, where the client includes the alternate resource,
  the method further comprising:
    replicating, by the alternate resource, actions of the primary resource during execution of the web-based client-server application after redirecting the scripting function call to the alternate resource.

3. The method of claim 1, where the web-based client-server application comprises an Asynchronous JavaScript and XML (AJAX) application, the method further comprising:
    replacing a function of the AJAX application with a proxy function at a runtime of the AJAX application, and
    receiving a redirection command, relating to redirecting the scripting function call, from the proxy function when the primary resource is unreachable.

4. The method of claim 1, where determining whether to redirect the scripting function call further includes:
    determining whether the browser is operating in an offline mode, and where redirecting the scripting function call includes:
    redirecting the scripting function call when the browser is operating in the offline mode.

5. The method of claim 1, where the alternate resource is located on a device that is external to the client.

6. The method of claim 1, where intercepting the scripting function call includes:
    intercepting, via the browser, data directed to the first communication layer,
        the first communication layer being associated with the primary resource.

7. The method of claim 1,
    where redirecting the scripting function call includes:
        accessing, via the second communication layer, the alternate resource to perform a function associated with the scripting function call.

8. A device comprising:
    a processor to:
        intercept a scripting function call at an object within a browser associated with the device,
            the scripting function call being generated by a web-based client-server application associated with the device, and
            the scripting function call being directed to a primary resource that is external to the device,
                the device being connected to the primary resource via a network,
        determine whether to redirect the scripting function call to an alternate resource,
            when determining whether to redirect the scripting function call, the processor is to:
                determine, via a first communication layer of the device, whether the primary resource is reachable via the network, and
        selectively:
            redirect the scripting function call to the alternate resource, via a second communication layer of the device, when the primary resource is unreachable via the network, or
            forward the scripting function call to the primary resource, via the first communication layer, when the primary resource is reachable via the network,
                the first communication layer being different than the second communication layer.

9. The device of claim 8, where the device includes the alternate resource, and
    where the processor is further to:
        replicate, using the alternate resource, actions of the primary resource during execution of the web-based client-server application.

10. The device of claim 8, where the web-based client-server application comprises an Asynchronous JavaScript and XML (AJAX) application, and
    where the processor is further to:
        replace a function of the AJAX application with a proxy function at a runtime of the AJAX application, and
        receive a redirection command, relating to redirecting the scripting function call, from the proxy function when the primary resource is unreachable via the network.

11. The device of claim 8, where, when determining whether to redirect the scripting function call, the processor is further to:
    determine whether the browser is operating in an offline mode, and where, when redirecting the scripting function call, the processor is to:
    receive a redirection command, relating to redirecting the scripting function call, when the browser is operating in the offline mode.

12. The device of claim 8, where the alternate resource is external to the device.

13. The device of claim 8, where, when intercepting the scripting function call, the processor is further to:
    receive, via the browser, data directed to the first communication layer, the first communication layer being associated with the primary resource.

14. The device of clam 13,
    where, when redirecting the scripting function call, the processor is further to:
        access, via the second communication layer, the alternate resource to perform a function associated with the scripting function call.

15. A non-transitory computer-readable medium storing instructions, the instructions comprising:
    a plurality of instructions that, when executed by a processor of a client device, cause the processor to:
        intercept a scripting function call at an object within a browser which is executing on the client device,
            the scripting function call being generated by a web-based client-server application associated with the browser, and
            the scripting function call being directed to a primary resource that is external to the client device,
                the client device being connected to the primary resource via a network;
        determine whether to redirect the scripting function call,
            one or more instructions, of the plurality of instructions, to
        determine whether to redirect the scripting function call including:
            one or more instructions to determine, via a first communication layer of the client device, whether the primary resource is reachable via the network; and
        selectively:
            redirect, via a second communication layer of the client device, the scripting function call to the alternate resource when the primary resource is unreachable via the network, or
            forward, via the first communication layer, the scripting function call to the primary resource when the primary resource is reachable via the network,
                the first communication layer being different than the second communication layer.

16. The non-transitory computer-readable medium of claim 15, where the client device includes the alternate resource,
    the instructions further comprising:
        one or more instructions that, when executed by the processor, cause the processor to replicate, using the alternate resource, actions of the primary resource during execution of the web-based client-server application.

17. The non-transitory computer-readable medium of claim 15, where the web-based client-server application comprises an Asynchronous JavaScript and XML (AJAX) application,
the instructions further comprising:
one or more instructions, that when executed by the processor, cause the processor to:
replace a function of the AJAX application with the proxy function at a runtime of the AJAX application, and
receive a redirection command, relating to redirecting the scripting function call, from the proxy function when the primary resource is unreachable.

18. The non-transitory computer-readable medium of claim 15, where the one or more instructions to determine whether to redirect the scripting function call further include:
one or more instructions that, when executed by the processor, cause the processor to:
determine whether the browser is operating in an offline mode, and
redirect the scripting function call when the browser is operating in the offline mode.

19. The non-transitory computer-readable medium of claim 15, where one or more instructions, of the plurality of instructions, to intercept the scripting function call include:
one or more instructions to receive, via the browser, data directed to the first communication layer,
the first communication layer being associated with the primary resource.

20. The non-transitory computer-readable medium of clam 19, where the first communication layer is used for accessing the primary resource via the network, and
where one or more instructions, of the plurality of instructions, to redirect the scripting function call include:
one or more instructions to access, via the second communication layer, the alternate resource to perform a function associated with the scripting function call.

* * * * *